United States Patent
Kunz

(10) Patent No.: US 10,160,154 B2
(45) Date of Patent: Dec. 25, 2018

(54) EXTRUSION BLOW MOLDED TUBE

(71) Applicant: ALPLA WERKE ALWIN LEHNER GMBH & CO. KG, Hard (AT)

(72) Inventor: Johann Kunz, Hard (AT)

(73) Assignee: ALPLA WERKE ALWIN LEHNER GMBH & CO. KG (AT)

( * ) Notice: Subject to any disclaimer, the term of this patent is extended or adjusted under 35 U.S.C. 154(b) by 261 days.

(21) Appl. No.: 14/778,949

(22) PCT Filed: Mar. 20, 2014

(86) PCT No.: PCT/EP2014/055660
§ 371 (c)(1),
(2) Date: Sep. 21, 2015

(87) PCT Pub. No.: WO2014/147206
PCT Pub. Date: Sep. 25, 2014

(65) Prior Publication Data
US 2016/0046059 A1   Feb. 18, 2016

(30) Foreign Application Priority Data

Mar. 20, 2013 (CH) .................................. 00637/13

(51) Int. Cl.
*B28B 5/00* (2006.01)
*B29C 49/04* (2006.01)
(Continued)

(52) U.S. Cl.
CPC .......... *B29C 49/04* (2013.01); *B29B 17/0005* (2013.01); *B29C 49/0005* (2013.01); *B29C 49/22* (2013.01); *B29C 49/4284* (2013.01); *B65D 35/08* (2013.01); *F16L 9/127* (2013.01); *F16L 9/133* (2013.01); *B29C 47/0004* (2013.01); *B29C 47/0023* (2013.01); *B29C 47/0054* (2013.01); *B29C 47/065* (2013.01); *B29K 2023/065* (2013.01); *B29K 2023/0625* (2013.01); *B29K 2105/26* (2013.01); *B29K 2995/0097* (2013.01); *B29L 2023/20* (2013.01); *B29L 2023/22* (2013.01)

(58) Field of Classification Search
CPC ............ B29C 45/1646; B65D 1/02115; B65D 81/266; B32B 27/18; B32B 27/32
USPC .................................... 428/34.1, 35.7, 36.91
See application file for complete search history.

(56) References Cited

U.S. PATENT DOCUMENTS 5,756,038 A * 5/1998 Iseli ......................... B29C 49/00
                                                                264/506
6,223,945 B1 * 5/2001 Giblin .................. B65D 1/0207
                                                                215/12.1
(Continued)

FOREIGN PATENT DOCUMENTS

EP        1029793 A1    8/2000
EP        1043235 A2   10/2000
(Continued)

*Primary Examiner* — Ellen S Wood
(74) *Attorney, Agent, or Firm* — Morriss O'Bryant; Compagni Cannon, PLLC

(57) ABSTRACT

The invention relates to an extrusion blow molded tube, which is filled or can be filled by way of its rear end, and the body, shoulder and neck of which are produced in one piece by extrusion blow molding. The tube has an LLDPE-rich layer with an LLDPE content of 50 to 95% by weight, and the average wall thickness of the tube in the region of the body is 0.3 to 0.85 millimeters.

22 Claims, 1 Drawing Sheet

(51) Int. Cl.
*B29C 49/00* (2006.01)
*B29C 49/22* (2006.01)
*B65D 35/08* (2006.01)
*B29B 17/00* (2006.01)
*B29C 49/42* (2006.01)
*F16L 9/127* (2006.01)
*F16L 9/133* (2006.01)
*B29L 23/20* (2006.01)
*B29C 47/00* (2006.01)
*B29C 47/06* (2006.01)
*B29K 23/00* (2006.01)
*B29K 105/26* (2006.01)
*B29L 23/00* (2006.01)

(56) References Cited

U.S. PATENT DOCUMENTS

| | | | | |
|---|---|---|---|---|
| 2002/0086174 A1* | 7/2002 | Genske | ............... | B32B 27/32 428/516 |
| 2002/0180114 A1 | 12/2002 | Cargile | | |
| 2008/0012172 A1 | 1/2008 | Merical | | |

FOREIGN PATENT DOCUMENTS

| | | | |
|---|---|---|---|
| EP | 1514805 | A1 | 3/2005 |
| EP | 2497453 | A1 | 9/2012 |
| WO | 2004074115 | A2 | 9/2004 |
| WO | 2007071304 | A1 | 6/2007 |
| WO | 2009144559 | A2 | 12/2009 |

\* cited by examiner

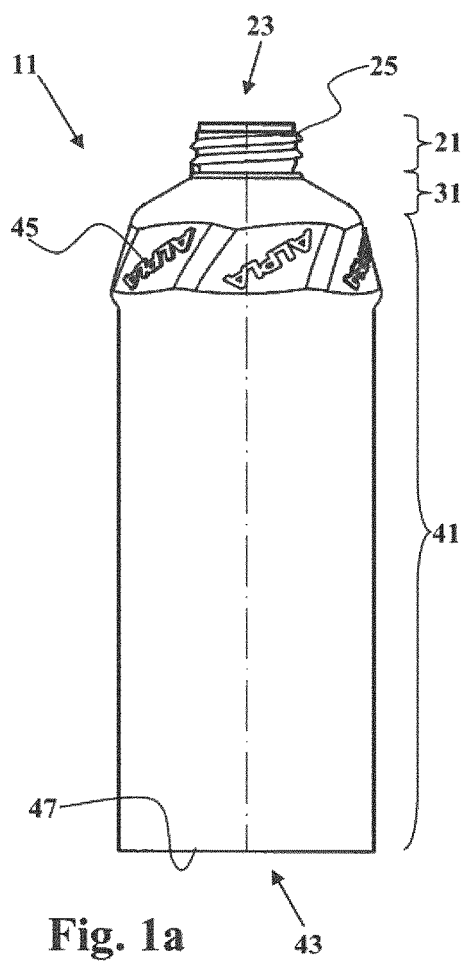
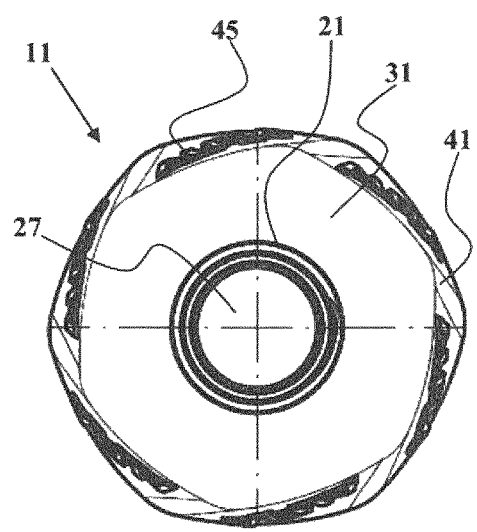
Fig. 1a
Fig. 1b

EXTRUSION BLOW MOLDED TUBE

CROSS-REFERENCE TO RELATED APPLICATIONS

This application is a national phase entry under 35 U.S.C. § 371 of PCT/EP2014/055660 filed on Mar. 20, 2014, which claims priority to Swiss Patent Application 00637/13 filed on Mar. 20, 2013, the entirety of each of which is incorporated by this reference.

TECHNICAL FIELD

The invention relates to an extrusion-blow-molded tube as well as a method for its production.

PRIOR ART

US2002/0180114 (from PCT/US01/45602) discloses a one-piece tube produced in an extrusion-blow-molding method, on which a rotatable closure is formed in one piece.

A method for producing a vial or ampoule for individual doses is known from WO2009/144559. The method includes the extrusion of a barrier layer into a tubular-shaped intermediate product, the expansion of the intermediate product into a two-part shape, and also the cutting off of the proximal end of the intermediate product in order to form a filling opening, which can be sealed after filling with the product. The barrier layer can be formed either from LLDPE, HDPE, LLDPE, EVOH, or from any other known barrier material. Barrier layers consist as a rule of only one material.

Further extrusion-blow-molded containers are known from EP1514805A1, WO2004074115A2, WO2007071304A1 and WO2009144559A2.

US 2008/0012172 discloses a container in the shape of a bottle for containing a moisture-sensitive product. The bottle has a container wall consisting of two layers, which wall is produced by co-extrusion. The inner layer contains a drying agent, and the outer layer consists of a solid, moisture-impermeable material. According to an embodiment the outer layer of the bottle consists of an HDPE (high density polyethylene) and the inner layer consists of LDPE (linear low density polyethylene) and a molecular sieve as drying agent.

EP-A1-2 497 453 discloses a plastic film with an oxygen-absorbing function, consisting of at least four co-extruded layers and an infusion bag produced therefrom. EP-A1-2 497 453 does not however provide any more specific details as to how the infusion bag is produced.

It is furthermore known that bags can be produced according to the prior art, in which a sheet is folded and the open longitudinal side is welded. Alternatively also two sheets can be placed on top of one another, and the two longitudinal sides can be welded. In both cases a tubular-shaped structure is obtained, on which the removal opening is formed by the action of heat. The filing of the bag then takes place via the still open end of the tube opposite the removal opening.

Advantages of the Invention

An advantage of the present invention is to provide a tube that can be produced simply and inexpensively in large numbers. In addition the invention should enable a tube to be produced that is optimized with regard to transparency and shape recovery effect. Further advantages of the present invention are disclosed in the following description.

SUMMARY OF THE INVENTION

The advantages mentioned above are achieved according to the invention by a tube and a method for its production.

More generally, the invention relates to an extrusion-blow-molded tube that has an LLDPE-rich layer and the average wall thickness of the tube in the region of the body is 0.3 to 0.85 mm. The wall thickness may be 0.3 to 0.65 mm. To the surprise of the inventors tubes according to the invention have an outstanding shape recovery effect over a large temperature range, which can reach far below 0° C., which is of fundamental importance in connection with the use of tubes. Conveniently the body, shoulder and neck of the tubes are produced in one piece by extrusion blow molding. The tube is advantageously a tube that is filled or can be filled at one end.

In order to achieve the aforementioned object a method is also disclosed for producing a tube, as described in this document. The method can be characterized by the fact that the body, shoulder and neck of the tube are produced in one piece by extrusion blow molding and thereby the LLDPE-rich layer and optionally further layers are produced.

Further advantageous development and modification possibilities are the subject of the dependent claims. A person skilled in the art can by arbitrary combination of the subject matters—unless otherwise mutually excluded—arrive at further subject matters that should be regarded as covered by the invention.

According to another, independent aspect of the invention an extrusion-blow-molded tube has an LLDPE-rich layer with an LLDPE content of 50 to 95 wt. %. In one embodiment of the invention the content of LLDPE (linear low-density polyethylene) in the LLDPE-rich layer can be 60 to 90 wt. % or 70 to 85 wt. %, referred to the total weight of the LLDPE-rich layer. The LLDPE-rich layer may contain as further material either HDPE (high density polyethylene) and/or LDPE (low density polyethylene). These alone or in combination can have a weight content of between 5 wt. % and 50 wt. %, between 10 wt. % and 40 wt. % or between 15 wt. % and 30 wt. %. Furthermore the extrusion-blow-molded tube can have a barrier layer for example of EVOH (ethylene vinyl alcohol). Such a barrier layer contains as a rule 3 wt. % to 5 wt. % LLDPE with or without the barrier layer and LDPE and/or HDPE together make up substantially 100 wt. %. It has been found that, owing to the aforedescribed high LLDPE content, a layer can be produced that has a good transparency, so that the product contained in the tube is visible to the consumer. The tube, particularly its inside, is suitable for containing products such as foodstuffs, cosmetic articles and paint, but also adhesives and lubricants. The tube can in this connection be translucent or opaque. In addition the shape recovery effect, i.e. the property of a container to return to its original shape after deformation or damage, is outstanding in tubes that consist wholly or in part of such an LLDPE-rich layer. This property is of outstanding importance in connection with the use of tubes. Also this LLDPE-rich layer means that the shape recovery effect can be ensured over a wide temperature range down to about −25° C. On account of the good thermal stability of the tubes provided with an LLDPE layer the product to be added to the tube can be filled at a temperature of up to 60° C. in order to improve its flowability, without the transparency or the shape recovery of the tube being adversely affected in everyday use. In addition it has been found that the LLDPE layer in a tube allows the formation of very contoured structures with substantially sharp-edged corners in extrusion blow molding, and thus permits the production of fine surface structures. Owing to the use of an LLDPE-rich layer in the tube it is possible to produce a contour formed as a raised portion, which at all edges and corners has a 0.05 mm to 0.1 mm larger radius than the corresponding depression with the raised portion formed in a cavity of the blow mold. Thus, it is possible for example to produce on the tube a contour all of whose corners and edges have a radius of 0.05 mm. If the cavity of a blow mold is operated with chip removal, then on account of the machining tools as a rule corners and edges with radii of 0.2 mm to 0.25 mm are produced. In this way a contour can be formed on the tube, all of whose edges and corners of the tube have a radius of up to about 0.3 mm and are thus perceived by the consumer as sharp edged. Accordingly the expression "substantially sharp edged" is understood to mean corners and edges that on a raised portion or depression facing towards the consumer have a radius that is equal to or less than 0.3 mm. Since the optional barrier layer extends in the extrusion-blown tubing from which the tube is produced, the barrier layer in the tube extends into the neck, shoulder and body.

A surface of the tube, in particular of the tube body, can have at least one raised portion and/or depression. This advantageously has the shape of a pattern, a graphics and/or a symbol (e.g. characters, letters, numbers, etc.). Such a decorated, ornamented or marked tube has the advantage of improved aesthetic appeal and a high recognition value. On account of the LLDPE layer in the tube, surface structures can be created that are characterized by filigree patterns. The raised portion and/or the depression can extend substantially transverse to a tube separation plane, since as a rule the tube is produced in a blow mold consisting of two halves. In a separation of the halves for the removal from the blow mold, the prefabricated tube together with its raised portion and/or depression can be removed without any special precautions. Of course, a slide can also be integrated in the blow mold in order to form a raised portion and/or depression that does not extend substantially perpendicular to the separation plane.

A width of the at least one raised portion and/or depression formed substantially sharp edged extends substantially along a central axis of the tube, and a depth of the at least one raised portion and/or depression formed substantially sharp edged extends substantially transverse to the central axis of the tube. For a width of 1 mm the achievable depth is about 1 mm. Accordingly the stretch ratio of depth to width is about 1 to 1. For a width or more than 1 mm a ratio of depth to width of up to 2 to 1 for a width of 10 mm is successively achieved. The depth can thus be 20 mm. For a width of less than 1 mm a ratio of depth to width of up to 1 to 2 for a width of 0.4 mm is successively achieved. The depth can thus be 0.2 mm. Values of the respective depth to be determined for a width between 1 mm and 10 mm, respectively a width of 1 mm and 0.4 mm, may at the same time obey a linear function or also a non-linear function.

According to a further development variant the LLDPE-rich layer additionally contains HDPE (high-density polyethylene). An HDPE content may be up to 5, 10, 15 or even up to 50 wt. %, referred to the total weight of the LLDPE-rich layer. It has been found that a corresponding HDPE content has a positive effect on the aforedescribed properties as regards the scratch resistance. If the tube is composed of more than one layer, then as a rule an outer layer facing the consumer has as large a content of HDPE as possible. Since HDPE is as a rule more rigid than LLDPE, this outer layer should be formed as thin as possible in order not to reduce the desired shape recovery effect of the tube.

Of course, it may also be possible to produce a very thin, extremely scratch-resistant outer layer on the tube, which has an HDPE content of more than 50 wt. % up to 80 wt. %.

It may be envisaged that the tube is produced in one layer by extrusion blow molding. Alternatively the tube can be characterized by the fact that it comprises at least two layers, wherein all layers are produced by extrusion blow molding.

According to a further embodiment of the invention an inner space of the tube is bounded by the LLDPE-rich layer. An LLDPE-rich layer thus forms an inner layer facing opposite the outer layer, with which products contained in the tube come into contact. The high LLDPE content in the LLDPE-rich layer can ensure very good results when welding an end region opposite the tube shoulder. The LLDPE-rich layer can in addition contain HDPE, in the amounts described for the LLDPE-rich layer.

According to a further development the tube has in addition to the LLDPE-rich layer a layer produced by extrusion blow molding with an HDPE content of more than 50, 60 or 70 wt. %, wherein in this connection the outermost layer may be produced by extrusion blow molding. If the layer is applied externally, then this increases the scratch resistance of the tube. Irrespective of the position of the aforementioned additional layer, it may be advantageous if the layer with a specified HDPE content is thinner than the LLDPE-rich layer, so as to affect only minimally the flexibility of the tube or its body.

The average wall thickness of the tube (i.e. the sum total of all layers produced by extrusion blow molding) is 0.3 to 0.65 mm in tubes of up to about 500 ml capacity. Such tubes may have a wall thickness between 0.45 and 0.5 mm. It has been found that a tube with an LLDPE-rich layer and with the aforementioned wall thickness has an outstanding shape recovery ability and is easy to handle. The wall thickness of an optional barrier layer is greater than or equal to 0.1 mm. As a rule the wall thickness of the barrier layer is about 3% of the total wall thickness of the tube.

Unless otherwise stated, the expression "end of the tube" should be understood as the rear end of the tube, i.e. the end facing opposite the neck of the tube (in relation to the tube body). If first of all a tube open at its end is produced, then it is envisaged to close, in particular to weld (e.g. by hot air or ultrasound or further suitable technologies) the end of the tube—conveniently after filling the tube. Before filling the tube the body of the tube may be substantially cylindrical (in particular with a substantially circular or elliptical or other cross-section). The labelling can be carried out in an advantageous manner if the tube is open and unfilled and therefore the body may have a two-dimensionally curved area in the region where the labelling is to be performed. The contents of the tube are removed from an outlet opening which is bounded by the neck and lies opposite the rear end If in addition it is envisaged that the end of the tube is welded in an end region, then it is advantageous if the wall thickness of the tube in the said end region (i.e. in the region of the weld seam to be formed) deviates by less than ±15%, or less than ±5% from the average wall thickness in this end region. With ±5% deviation, for a tube wall thickness of 0.5 mm the wall thickness in the end region differs by ±0.025 mm. It has been found that the welding is thereby greatly simplified and weld seams with accumulated material, in particular resulting from material squeezed out from the squeezing bar, can be avoided.

Also, the weldability of the tube can be assisted by the geometrical shape of the tube and tube body. For this purpose the separation plane of the blow mold can be arranged so that this plane intersects the points of the end region of the tube furthest from the central axis. Thus, the position of the separation plane of the blow mold in an end region of circular-cylindrical cross-section is arbitrary. With an end region with an elliptical cross-section the separation plane of the blow mold as a rule passes through the principal vertex. With an end region with a hexagonal cross-section the separation plane of the blow mold as a rule passes through two oppositely facing corners.

The tube can in addition to the LLDPE-rich layer have a layer of regenerated material produced by extrusion blow molding. Alternatively or in addition to this the barrier layer (for example of EVOH) can be present in the tube wall, to which a layer of bonding agent can be joined. Such bonding agent layers can for example be arranged on both sides of the barrier layer.

If a regenerated material layer is provided, then this may contain material that has been separated during the production process of tubes of the same type or corresponding intermediate products. This can take place in a method for producing a tube, as described in this document. In such a method the body, shoulder and neck of the tube may be produced in one piece by extrusion blow molding, wherein the tube has an LLDPE-rich layer. To incorporate the aforementioned regenerated material layer the method can also include the following steps: extrusion of a tubular-shaped preform; introduction of the preform into a blow mold and expansion of the preform by applying pressure; removal of the resultant intermediate product from the mold; removal of the bottom of the intermediate product; comminution of the bottom to form regenerated material; recycling of the regenerated material to the production process; production of a layer containing regenerated material as part of the tube.

In addition the excess material from the bottom and neck can be added to the regenerated material. The regenerated material can be ground and optionally agglomerated or regranulated before grinding. In addition new, i.e. non-recycled LLDPE and/or HDPE or another polymer can be admixed with the regenerated material. Correspondingly the regenerated material layer (and optionally the granulate) can consist substantially exclusively of regenerated material or contain regenerated material. The admixture of fresh polymer as a rule facilitates the processing and therefore the production process of the tube. The regenerated material layer can in conjunction with a barrier layer be arranged, depending on the requirements placed on the tube, closer than the barrier layer on an inner space bounded by the tube wall, or vice versa.

The production of the tube takes place in the extrusion blow molding method, in particular in a tube blow molding method. In this connection a continuous or a discontinuous extrusion blow molding method can be employed. According to a development variant, a plastic tube is extruded from a tube head, introduced into a blow mold, inflated by excess pressure (conveniently via a blow mandrel) and hardened by cooling, and then removed from the blow mold.

It is possible to use for the method an extrusion blow molding machine that comprises one or more tube heads. Each of the tube heads can be equipped with one or more extrusion nozzles.

According to a development variant the employed extrusion blow molding machine has one or more blow molds with in each case one or more cavities. It can furthermore have one or more blow mandrels.

The extrusion blow molding machine used for the method may comprise at least one extruder for supplying the plastic material, if the tube is to be produced simply from one layer. If the tube is produced from layers of different plastic materials, then the machine has as many extruders as there are different plastic materials and layers. The exit of the extruder is connected to the tube head, at whose outlet nozzle (which may be adjustable as regards the opening width) the single-layer or multilayer extruded tube exits. The tube formed therefrom is correspondingly single-layer or multilayer.

The tube can optionally be extruded as a tube with visible strips, decorative strips or, as regards the circumference, with a plurality of for example differently colored segments.

The blow mold can be wholly or partly opened to receive and/or remove the tube. For example, this can take place by separating two blow mold halves comprising respectively one half of a complete cavity (complete opening). Alternatively the blow mold can be opened only at one or both ends (partial opening). According to one development, after the closure of the blow mold the tube is separated between the blow mandrel and the blow mold. The separation can place for example by squeezing or also by cutting off. A blow mandrel is suitably inserted into the cavity of the blow mold, and the tube section in the cavity is inflated until it abuts the inner sides of the cavity or has adopted its shape. Following this—generally after a cooling step—it can be removed as intermediate product. Further steps that are envisaged are the separation of the excess material from the bottom and neck of the tube as well as the separation of the bottom and optionally the recycling of the separated material as regenerated material to the process.

According to a further development it may be envisaged that the extruded plastic tube is continuously held during the whole production cycle of a tube. A possible way of achieving this is to install holding devices for the plastic tube on opposite sides of the blow mold. The holding devices for the tube can be formed on the one hand by the blow mandrel and on the other hand by the tube head, or can be realized in the form of additional device parts. A separating device for separating the tube can then be provided on the side of the blow mold arrangement facing away from the tube head. The blow mold cavity has on the side of the blow mandrel (in this variant on the side facing away from the extrusion nozzle) a mouth, in which the blow mandrel can be inserted into the blow mold cavity.

A known extrusion blow molding machine in which a number of blow molds are arranged on a rotating wheel can also be used.

The method can furthermore include as process steps the realization of one or more of the features of the described tube. Accordingly the tube according to the invention can include features that can be implemented by one or more of the process steps mentioned in connection with the method.

Terms and expressions in this document should be understood as they would be understood by a person skilled in the art in the field. In particular in the case where ambiguities arise, the definitions given in this document can be referred to as an alternative or by way of extra clarification.

BRIEF DESCRIPTION OF THE DRAWINGS

Brief description of the drawings, which show in a schematic representation not true to scale:

FIG. 1a a side view of an unfilled tube,

FIG. 1b a planned view (enlarged) of the tube of FIG. 1a.

DETAILED DESCRIPTION OF THE INVENTION

The invention is described by way of example hereinafter with the aid of the drawings.

FIGS. 1a and 1b show a tube 11 from the side (FIG. 1a) and from above (FIG. 1b). The planned view is shown on an enlarged scale for a better visualization of the details compared to the side view. The tube 11 has a neck 21, a shoulder 31 and a body 41, which are produced in one piece by means of extrusion blow molding, wherein the tube 11 has a LLDPE-rich layer with an LLDPE content of more than 50, 60 or 70 wt. %, produced by the extrusion blow molding. The LLDPE is conveniently admixed with at least one other polymer, such as for example HDPE, in an amount of 5, 10, 15 up to 50 wt. %, wherein the aforementioned values refer to the amounts in the total weight of the LLDPE-rich layer. The neck 21 on the front end 23 of the tube is provided with an opening 27 for releasing the tube contents during use by the consumer, and in the present example has a thread 25 for fastening a cover (not shown), although the use of a plurality of other closure mechanisms known from the prior art is also conceivable. The shoulder 31 is the part of the tube 11 starting and widening out from the neck 21, which joins the neck 21 to the body 41. In FIG. 1a the tube 11 is shown in the state before the filling. The body 41 is still open at an end region 43 lying opposite the neck 21 or has an opening 47 through which the tube 11 can be filled. The body 41 is in this state advantageously substantially cylindrical, with a substantially circular or oval cross-section, which inter alia facilitates the labelling. In order to produce the described tube shape, first of all a substantially bottle-shaped intermediate product can be produced by means of extrusion blow molding, following which its bottom part is separated, thereby forming the opening 47. The material from which the bottom part is produced can be recycled again to the process as regenerated material and can form a layer of the tube. Such a recycling reduces costs and protects the environment. The regenerated material obtained from the excess material from the bottom part and neck as well as from the separated bottom part can optionally be admixed before the production of the regenerated material layer, with new, i.e. non-recycled polymer material such as e.g. HDPE and/or LLDPE in an amount (referred to the weight of the regenerated material layer) of 10 to 30 wt. %, in order to facilitate the processing of the regenerated material. Agglomerated or regranulated regenerated material can also be directly processed up to 100%, i.e. without admixing. After the filling of the tube 11 the opening 47 is closed. This generally takes place in that the body 41 is pressed together at the end region 43 until opposite internal sides of the body 41 in relation to the opening 47 contact one another. These contacting regions at the end region 43 of the tube 11 are then conveniently welded together, for example by means of ultrasound or heat. The welding is greatly simplified if the wall thickness of the tube body 41 in the region at the end region 43 of the tube to be welded is substantially constant or at least does not deviate more than ±15% or ±5% from the average wall thickness in this end region 43. The body 41 has in the illustrated example raised portions 45 in the form of letters. The use of an LLDPE-rich layer, as was described above, allows the formation of raised portions 45 in/or depressions with substantially sharp-edged structures. Substantially sharp-edged is understood here to mean that the edges and corners of the raised portions 45 and/or depressions have a radius of 0.05 mm to 0.3 mm. Tubes with such decorations and ornamentation have an improved recognition value, whereby mistakes can be avoided.

The invention relates to an extrusion-blow-molded tube, which is filled or can be filled via its rear end, and whose body, shoulder and neck are produced in one piece by extrusion blow molding. The tube has an LLDPE-rich layer with an LLDPE content of 50 to 95 wt. %, and the average wall thickness of the tube in the region of the body is 0.3 to 0.65 mm.

The invention claimed is:

1. An extrusion blow molded tube, comprising:
a tube comprised of a one-piece, blow molded body, having a shoulder, a neck and a rear end opposite the neck, the neck of the tube defining a first opening through which contents of the tube can be released by a user after filling the tube and the rear end of the tube defining a second opening through which the tube is filled with the contents, the tube having a LLDPE-rich layer with a LLDPE content of at least about 50 wt. % and the tube having an average wall thickness in a region of the body of between about 0.3 mm to about 0.85 mm.

2. The extrusion blow molded tube of claim 1, wherein the LLDPE-rich layer has an LLDPE content of between about 50 wt. % to about 95 wt. %.

3. The extrusion blow molded tube of claim 1, wherein the LLDPE-rich layer has an LLDPE content of between about 60 wt. % to about 90 wt. %.

4. The extrusion blow molded tube of claim 1, wherein the LLDPE-rich layer has an LLDPE content of between about 70 wt. % to about 85 wt. %.

5. The extrusion blow molded tube of claim 1, wherein the LLDPE-rich layer contains HDPE and wherein the content of HDPE in the LLDPE-rich layer is at least 10 wt. %.

6. The extrusion blow molded tube of claim 5, wherein the average wall thickness of the tube in the region of the body is between about 0.45 mm to about 0.5 mm.

7. The extrusion blow molded tube of claim 1, wherein the body, shoulder and neck comprise a barrier layer having a content of between about 3 wt. % and about 5 wt. % of the tube.

8. The extrusion blow molded tube of claim 1, wherein an end region of the tube opposite the neck is configured to be welded and wherein a wall thickness of the end region before welding differs by less than about ±15% from an average wall thickness in the end region.

9. The extrusion blow molded tube of claim 1, wherein the body of the tube is substantially cylindrical prior to filling.

10. The extrusion blow molded tube of claim 1, wherein the tube is comprised of a single one layer and is formed by extrusion blow molding.

11. The extrusion blow molded tube of claim 1, wherein the tube is comprised of at least two layers and wherein the at least two layers are formed by extrusion blow molding.

12. The extrusion blow molded tube of claim 11, wherein an inner space defined by the tube is bounded by the LLDPE-rich layer.

13. The extrusion blow molded tube of claim 11, wherein one of the at least two layers is comprised at least in part of regenerated material.

14. The extrusion blow molded tube of claim 11, wherein an outer layer of the at least two layers has an HDPE content of more than about 50 wt. %.

15. The extrusion blow molded tube of one of claim 1, wherein a surface of the body of the tube comprises at least one raised portion, or at least one depression, in the form of a pattern, a graphics or a symbol.

16. The extrusion blow molded tube of claim 15, wherein the at least one raised portion or the at least one depression is defined by substantially sharp edges.

17. The extrusion blow molded tube of claim 16, wherein a width of the at least one raised portion or the at least one depression extends substantially along a central axis of the tube, and a depth of the at least one raised portion or the at least one depression extends substantially perpendicular to the central axis of the tube, and wherein where the width of the at least one raised portion or the at least one depression is about 1 mm, the depth of the at least one raised portion or the at least one depression is about 1 mm.

18. The extrusion blow molded tube of claim 17, wherein for widths between about 1 mm and 10 mm, a ratio of depth to width of the at least one raised portion or the at least one depression changes progressively from 1:1 to 2:1.

19. The extrusion blow molded tube of claim 17, wherein for widths less than 1 mm to about 0.4 mm, a ratio of depth to width of the at least one raised portion or the at least one depression changes progressively from 1:1 to 1:2.

20. The extrusion blow molded tube of claim 1, wherein the LLDPE-rich layer of the tube provides a shape recovery effect to allow the tube to return to its original shape after deformation or damage.

21. The extrusion blow molded tube of claim 20, wherein the shape recovery effect of the tube can occur down to about −25° C.

22. The extrusion blow molded tube of claim 1, wherein the contents comprise at least one of foodstuff, a cosmetic article, paint, an adhesive or a lubricant.

* * * * *